United States Patent [19]
Givens

[11] Patent Number: 5,558,043
[45] Date of Patent: Sep. 24, 1996

[54] LIGHTWEIGHT, PORTABLE ANIMAL GROOMING STALL

[76] Inventor: Donovan J. Givens, 21420 County Rd. 10, Corcoran, Minn. 55340

[21] Appl. No.: 319,074

[22] Filed: Oct. 6, 1994

[51] Int. Cl.$^6$ ........................................................ A01K 1/00
[52] U.S. Cl. .......................................... 119/519; 119/526
[58] Field of Search .................................... 119/27, 14.03, 119/28, 735, 750, 516, 519, 525

[56] References Cited

U.S. PATENT DOCUMENTS

| | | |
|---|---|---|
| 1,253,494 | 1/1918 | James . |
| 2,714,367 | 8/1955 | Arnold ........................................ 119/27 |
| 2,720,861 | 10/1955 | Stroup et al. ............................. 119/28 |
| 4,244,324 | 1/1981 | Kratky ....................................... 119/27 |
| 4,350,117 | 9/1982 | Hacker ....................................... 119/27 |
| 4,444,150 | 4/1984 | Hueftle et al. ............................ 119/27 |
| 4,470,372 | 9/1984 | Norman ..................................... 119/27 |
| 4,590,886 | 7/1986 | Brashear ................................... 119/27 |
| 4,599,972 | 7/1986 | Kilburn ..................................... 119/27 |
| 4,649,864 | 3/1987 | Osthoff ..................................... 119/27 |
| 4,702,199 | 10/1987 | Seal .......................................... 119/735 |
| 5,197,412 | 3/1993 | Wade ........................................ 119/735 |

Primary Examiner—Robert P. Swiatek
Assistant Examiner—Yvonne R. Abbott
Attorney, Agent, or Firm—Evenson, McKeown, Edwards & Lenahan, P.L.L.C.

[57] ABSTRACT

A lightweight, portable grooming stall for an animal includes a substantially U-shaped bar having a front portion and two legs. A three point support system couples with the U-shaped bar so as to maintain the U-shaped bar in a horizontal attitude. A base system is coupled to the three point support system. The base system underlies the U-shaped bar. A restraint system is variably positioned across the two legs of the U-shaped bar. The base system includes a second substantially U-shaped bar supported on a floor level. The second U-shaped bar underlies the U-shaped bar. A mat is arranged to overlie the second U-shaped bar.

12 Claims, 4 Drawing Sheets

LIGHTWEIGHT, PORTABLE ANIMAL GROOMING STALL

FIELD OF THE INVENTION

This invention relates to animal confining stalls and, more particularly, to a lightweight and portable animal confining stall which provides easy access for cleaning and grooming of the animal.

BACKGROUND OF THE INVENTION

Various types of animal confinement or restraining stalls or pens have been known for a long time. These known stalls all make use of numerous bars or tubes in order to restrain the animal. Examples of such known stalls can be found in U.S. Pat. Nos. 1,253,494, 2,714,367, 4,350,117, 4,590,886, 4,649,864, 4,470,372 and 4,444,150.

While such known stalls may be sufficient to confine animals when permanently erected on a farm or the like, they are not easily transportable for temporary use or for use such as at an animal show. For example, show horses exhibited at a crowded display hall are provided by the show organizers with only a limited amount of space to be stalled. Within this limited amount of space, which often times is a dusty or muddy dirt floor pen, the animals are frequently tied in such a position that their back end is in or near an aisle which carries a stream of pedestrian traffic. This creates a danger in that a large animal may kick and cause injury to a pedestrian. Furthermore, because each animal presented at a show needs some sort of final washing, grooming, etc., the limited amount of space hinders the owner from cleaning the animal.

While some portable stalls are known, such as in U.S. Pat. Nos. 4,590,886 and 4,599,972 mentioned above, these stalls are not suitable for animal show use. Such known stalls while technically being "portable", may still weigh hundreds of pounds, thus in practicality severely limiting their portability. For example, U.S. Pat. No. 4,599,972 would be extremely heavy and impractical to quickly set up and tear down for use at an animal show. Furthermore, the multiple number of components forming the multiple stalls do not allow a groomer access to the animal in order to prepare the animal for display. Similarly with the single portable stall described in U.S. Pat. No. 4,590,886, the extensive side frames restrict the groomer's access to the animal. The horse stall can also be easily tipped by a large animal as there is no bottom support provided.

Still further, it is a disadvantage of both U.S. Pat. Nos. 4,590,886 and 4,599,972, that the animal's feet are still exposed to an underlying dusty or muddy dirt surface.

There is therefore needed an animal grooming stall which is lightweight, portable and provides substantial access to allow the animal to be washed, groomed, etc. The grooming stall should require only minimal effort to construct and yet be sufficiently sturdy so as to prevent the animal from tipping the stall or kicking and injuring a bystander.

SUMMARY OF THE INVENTION

These needs are met according to the present invention by providing a lightweight, portable animal grooming stall. The invention makes use of a substantially U-shaped bar having a three point support system. The U-shaped bar is arranged horizontally above the floor level at a sufficient height to generally surround the animal to be confined. The U-shaped bar is supported by three generally upright arranged legs, one being located at the midpoint of the U-shape and the other two being arranged at each end of the legs. The support legs or bars are arranged in a base system located on the floor. The base system has the advantage of making use of the animal's weight to prevent the animal from tipping the grooming stall.

In a first preferred embodiment, the base system makes use of a second substantially U-shaped bar arranged on the floor underlying the first U-shaped bar. The second U-shaped bar is sized so as to be slightly larger than the first U-shaped bar, thus providing a more stable base system. At a minimum, the second U-shaped bar will be of the same size as the first U-shaped bar. The support legs are inserted into upright tubes attached to the second U-shaped bar. A washing mat, such as is used at horse shows to cover a dirt floor, is provided over the second U-shaped bar and, together with the weight of the animal, secures the grooming stall in place.

It is an advantage of the present invention that the use of two U-shaped bars provides a stable arrangement for the stall. Further, the number of components in the system is limited to the two U-shaped bars and the three vertical support legs. Thus, quick and easy assembly and disassembly of the grooming stall can be performed. Also, because of the limited number of components, the stall can be compactly bundled to increase its portability.

In another preferred embodiment of the present invention, the base system makes use of three flat plates which rest on the ground floor. The flat plates include posts into which the support legs are inserted. Again, as with the U-shaped bar base system, a rubber mat, such as is commercially available, is provided over the flat plates and, together with the animal's weight, maintains the grooming stall in place.

It is an advantage of the present invention that the components of the grooming stall can be quickly and easily disassembled through the use of pin and slot engagements of the components. Of course, other types of connections can be used provided they allow for easy assembly and transport of the stall components. In certain preferred embodiments, coupling components are used to connect the grooming stall. The coupling components further allow the U-shaped bars to be disassembled into separate "L" shaped sections so as to make the stall even more compact to aid its transportability.

The present invention further provides a restraint system that can be variably sized so as to maintain the animal in close contact with the stall structure. The present invention makes use of a variably positioned "butt" bar which can be slid into place after the animal has been led into the stall. This is accomplished through the use of several slots provided at each end of each leg of the U-shaped restraint bar. Once the animal is led into the stall, the butt bar is slid into place through the corresponding slots at each end of the legs of the U-shaped bar. The butt bar is preferably a solid metal bar having caps at each end to prevent the butt bar from easily sliding out of the slots due to bumping or hitting of the stall during its use.

In other preferred embodiments, the butt bar can be a solid metal bar that is held in place by its own weight along with attached chain links extending from each end. The chain links further include an additional weight at their other end to hold the butt bar in position.

It is an advantage of the present invention to use the simple butt bar arrangement so as to allow the groomer to remove the butt bar quickly in the event the animal becomes agitated and requires removal from the grooming stall.

In another preferred embodiment of the present invention, rollers are provided on the lower U-shaped bar so as to make the grooming stall easily transportable. The rollers can be mounted using a lever mechanism so that the entire structure can be quickly raised once the weight of the animal is removed from the mat. Similarly, rollers could be provided for the flat plate base system so as to also allow easy transport of the grooming stall.

In preferred embodiments, the components of the grooming stall can be made from structural aluminum, galvanized steel, or the like. It is an advantage that an aluminum constructed grooming stall weighs only approximately 12 lbs. The steel version of the design weighs around 65 lbs. The lightweight nature of the stall makes transportation of the grooming stall easy. For example, United Parcel Service (UPS) regulations allow shipments of packages weighing less than 70 lbs. Hence, not only can the portable grooming stall according to the present invention be carried in trailers or automobiles, but it can even be sent UPS.

It is a further advantage of the present invention that the "open" design of the grooming stall provides for a less threatening environment in which to confine the animal. Accordingly, the animal is less likely to experience behavioral problems when in the stall.

It is a still further advantage of the invention to make use of "outriggers" or tabs connected to the lower U-shaped bar to aid in securing the mat to the base system. The outriggers can be welded to the lower U-shaped bar so as to provide a landing pad to which the mat can be secured through a nut and bolt arrangement. The use of the outriggers has the advantage of further stabilizing the base system, and hence the entire stall, in the event a spooked animal attempts to tip the entire structure by severely leaning against a side rail of the upper U-shaped bar.

Other objects, advantages and novel features of the present invention will become apparent from the following detailed description of the invention when considered in conjunction with the accompanying drawings.

DETAILED DESCRIPTION OF THE DRAWINGS

Figure 1:
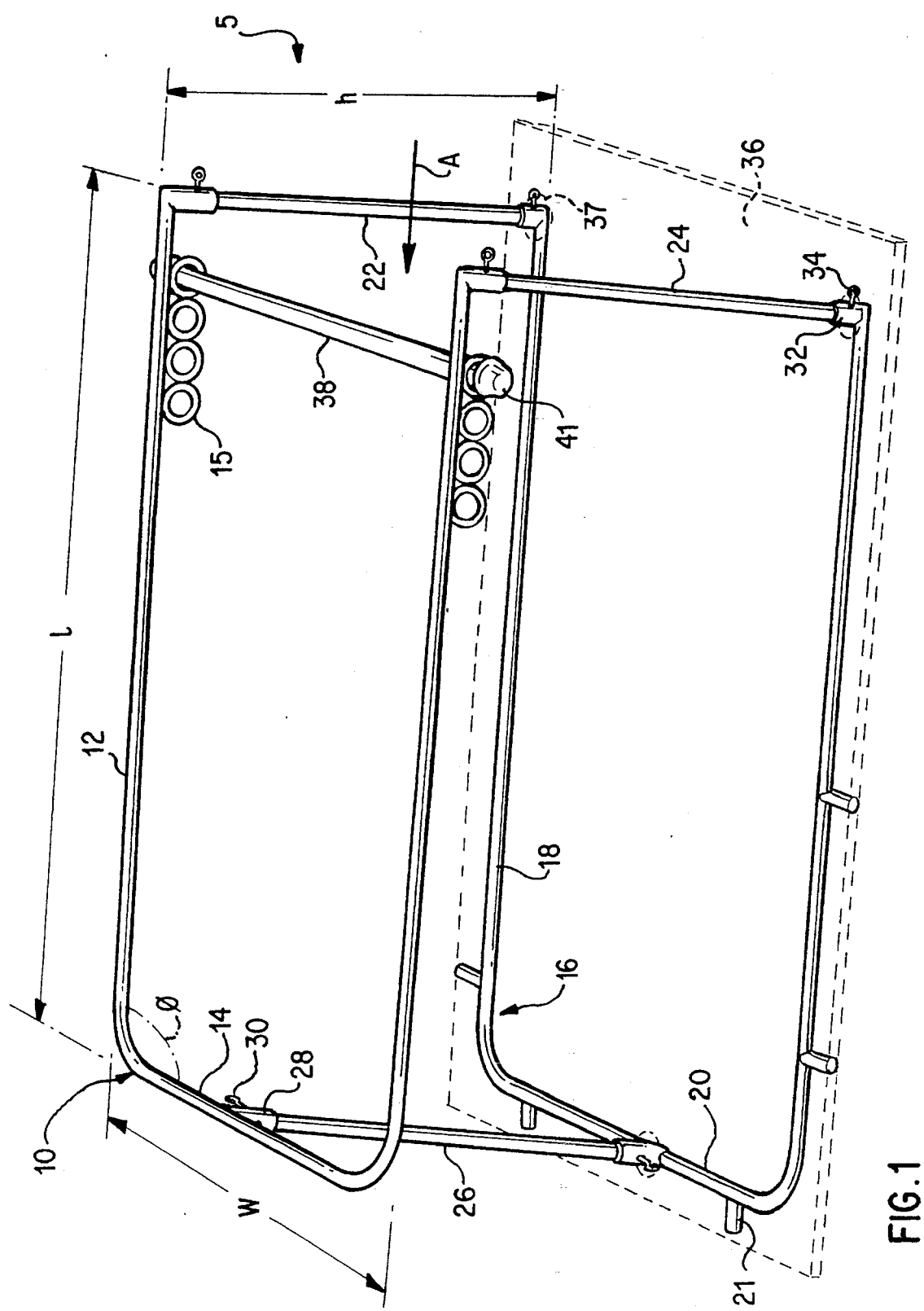
FIG. 1 is a perspective view of the lightweight, portable grooming stall according to the present invention.

Referring to FIG. 1, an animal grooming stall 5 includes a first generally U-shaped bar 10 having a front portion 14 and two leg portions 12. The U-shaped bar 10 is arranged horizontally at a predetermined height above the ground floor. The U-shaped bar 10 is supported at three points through the use of upright support members 22, 24 and 26.

The upright members 22, 24 and 26 are coupled to the U-shaped bar 10 through the use of a tube 28 and pin 30 arrangement. As shown in FIG. 1, a first upright support member is coupled to the midpoint of the front portion 14 of the U-shaped bar 10. The other two upright support members 22 and 24 are coupled to the free ends of the legs 12 of the U-shaped bar 10. It will be readily understood by those skilled in the art that couplings other than the tube and pin arrangement 28, 30 shown in FIG. 1 can be used without departing from the spirit and scope of the invention.

Figure 2:
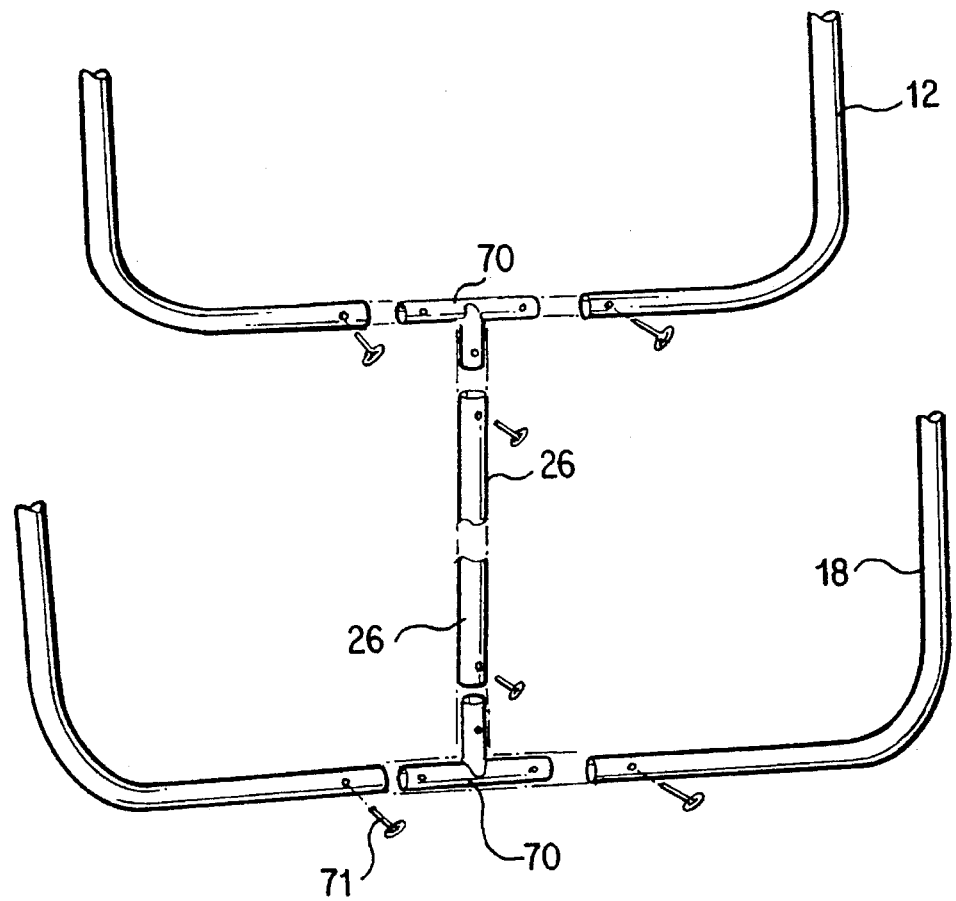
FIG. 2 is a detailed perspective view illustrating a T-shaped insert used to join the upper and lower U-shaped bars with an upright support leg.
Figure 3:
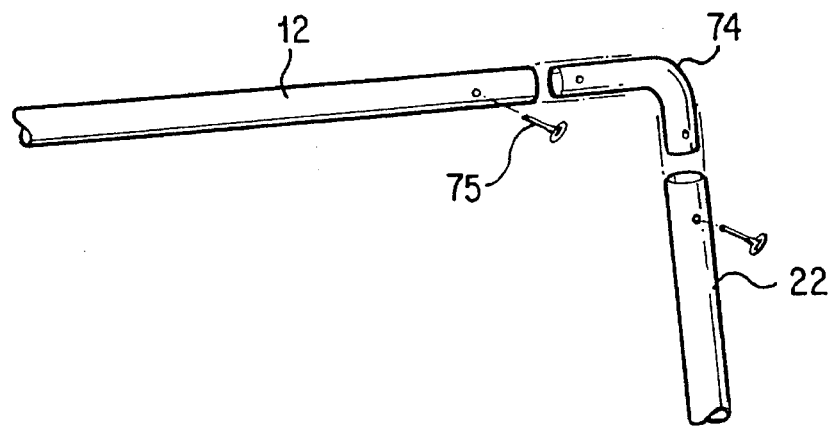
FIG. 3 is a detailed perspective view showing an angle insert used to join a free end of the U-shaped bars with an upright support let.

For example, the use of additional coupling components as illustrated in FIG. 2 can provide an even more compact grooming stall when disassembled. The coupling components make use of a T-shaped insert 70 that connects to "L" shaped portions forming the upper and lower generally U-shaped bars 12, 18. The T-shaped inserts 70 can also use pin couplings 71 to secure the assembly together. In a similar manner, as shown in FIG. 3, the free ends of the upper 12 and lower (not shown) U-shaped bars can be joined to the upright support members 22 through the use of angle inserts 74. These angle inserts 74 can slide into each open end of the corresponding leg 12 and upright support member 22. The angle inserts 74 can be secured therein in a similar manner as the T-shaped insert through the use of a pin coupling 75. Of course, numerous other coupling arrangements can be provided without departing from the spirit and scope of the invention.

A base support system includes a second generally U-shaped bar 16 having a front portion 20 and two leg portions 18. The second U-shaped 16 is arranged to underlie the first U-shaped bar 10. The opposite ends of the vertical support members 22, 24 and 26 are similarly coupled to the second U-shaped bar 16 through the use of tube 32 and pin 34 couplings. The second generally U-shaped bar 16 is sized so as to be slightly larger than the first U-shaped bar 12, thus providing a more stable base system. In this manner, upright support legs 22, 24, 26 are slightly angled outward from the first U-shaped bar 12 toward the lower U-shaped bar 16. At a minimum, the lower U-shaped bar 16 should be of the same size as the first U-shaped bar 12.

In this manner, the grooming stall 5 can be quickly and easily assembled and disassembled, while providing a stable stall when assembled. A floor mat 36, such as a rubber mat used in washing animals on dirty or muddy areas where splashing renders the cleaning process ineffective, is used to cover the lower U-shaped bar 16. The mat 36 is illustrated in FIG. 1 by dotted lines so as not to obstruct the view of the lower U-shaped bar 16. In this regard, the mat 36 is provided with cut-out portions 37 so as to allow the post tubes 32 to extend therethrough in order to assemble the grooming stall 5.

Figure 6:
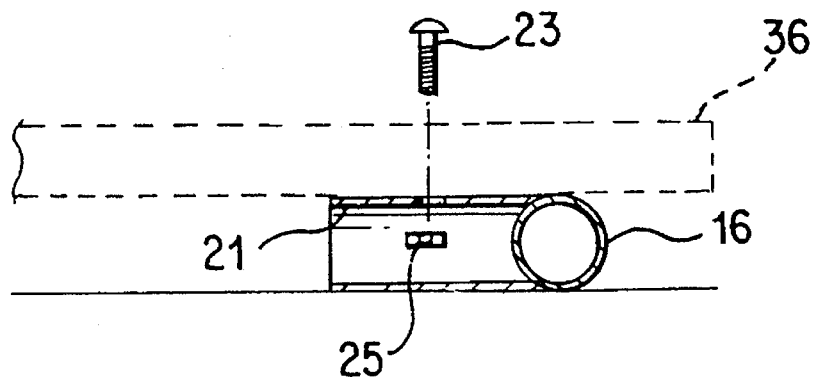
FIG. 6 is a detailed cross-sectional view through an outrigger attached to the lower U-shaped bar.

Outriggers 21 can be connected with the lower U-shaped bar 16 so as to further securely couple the mat 36 with the lower U-shaped bar 16. Any number of outriggers 21 can be used in connection with the lower U-shaped bar 16 by, for example, being welded thereto at spaced intervals along the lower U-shaped 16. Referring to FIG. 6, there is shown a cross-sectional view through the lower U-shaped bar 16 and outrigger 21. As shown therein, the mat 36 (illustrated in dashed lines) can be further secured to the lower U-shaped bar 16 through the use of a screw or a bolt 23 and nut 25 connection. The outriggers 21 permit the mat 36 to be securely attached to the lower U-shaped bar 16 in such a manner that it will not separate from the lower shaped bar 16 in the event a spooked animal severely leans against one side of the entire structure.

Once an animal is placed in the stall 5, the animal is secured therein through the use of a butt bar 38. The butt bar 38 can be, for example, a solid steel bar or rod having end caps 41 secured thereto. The end caps 41 can be sized slightly larger than the rod 38 so as to prevent the rod 38 from slipping out of slots 15 provided at the open ends of the upper U-shaped bar 10. As seen in FIG. 1, the slots 15 can be formed by securing horseshoes to the ends of the legs 12 in a decorative fashion. Of course, other less decorative slot 15 arrangements can be used without departing from the spirit and scope of the invention.

Figure 7:
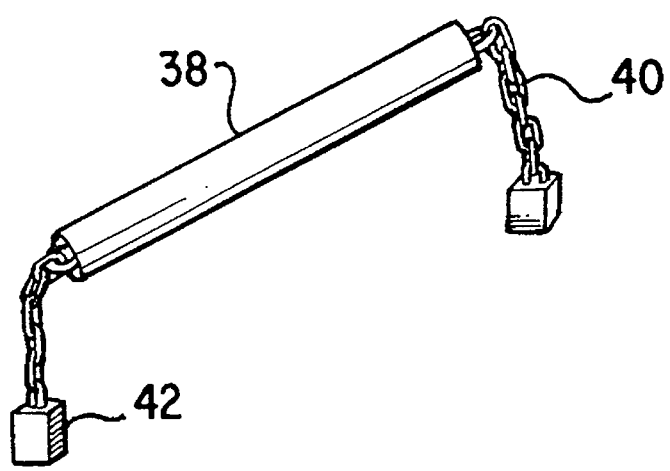
FIG. 7 is a perspective view of a further butt bar that can be used with the present invention.

Alternatively, the butt bar 38 can be, for example, a solid steel bar having chains 40 attached to each end as shown in FIG. 7. At the distant end of the chains 40, there is connected a further bar 42 to provide additional weight to keep the butt bar in place.

Figure 4:
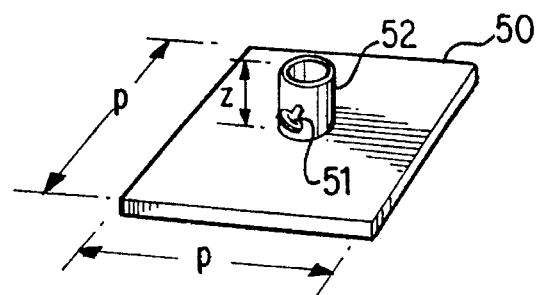
FIG. 4 is a perspective view of another embodiment of the base system for the present invention.

Referring to FIG. 4, there is shown an alternate embodiment for the base system for the grooming stall. A heavy flat plate 50 is arranged on the ground floor to support each upright support leg 22, 24, 26 (FIG. 1). The distant ends of the vertical support legs 22, 24, 26 are each inserted into, or couple over, a post 52 that is connected with the flat plate 50. A pin 51 is used to maintain the coupling.

As will be readily understood by those skilled in the art, the flat plates 50 can be covered with a rubber mat 36 in a similar manner to that of FIG. 1. Thus, the combination of the weight of the mat, the weight of the animal, and the weight of the metal plates 50, stabilizes the grooming stall. In a preferred embodiment, the flat plate 50 is a square plate having dimensions "p" of 15"×15". The height "z" of the post 52 can be approximately 8". Of course, as discussed above, alternate securing arrangements besides the pin 51 and post 52 system can be used without departing from the spirit and scope of the invention. All that is required is that the arrangement provide a simple and easily detachable coupling.

Figure 5:
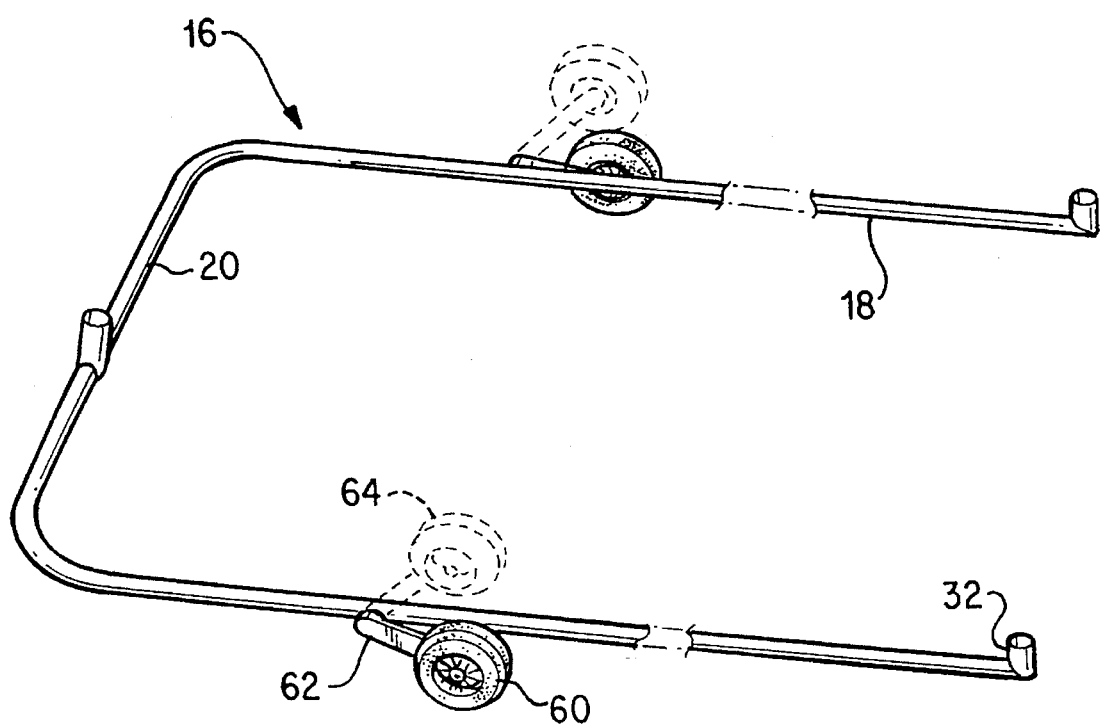
FIG. 5 is a perspective view of the lower U-shaped bar having rollers according to the present invention.

Referring to FIG. 5, the lower U-shaped bar 16 is shown in a preferred embodiment to have a pair of rollers 60 to aid in transporting the grooming stall. The rollers 60 are coupled with each leg 18 of the U-shaped bar 16 via a lever mechanism 62. The lever mechanism 62 can be raised so as to disengage the roller 60 from the floor when not in use as shown by the dotted lines 64. Of course, alternate arrangements can be used to enable the grooming stall to be portable.

In preferred embodiments of the invention, the dimensions of the grooming cart can be seen from FIG. 1. When in use in conjunction with horses for example, the height "h" of the horizontally arranged U-shaped bar 10 can be between 42" to 48" above floor level. This will allow for maximum access to the horse for cleaning, grooming and the like. The width "w" of the grooming stall 5 can be approximately 42" and the length "l" approximately 72". In a like manner, the dimensions of the lower U-shaped bar 16 can be sized slightly larger than the upper U-shaped bar so as to provide a more stable base system. Of course, these dimensions can vary depending upon the size and type of animal to be confined in the grooming stall. It is further preferable that the angle e formed between the legs 12 and front portion 14 of the U-shaped bars 10 and 16 be approximately 90°.

In use, the animal, such as a horse, is led into the grooming stall 5 as indicated by arrow A. Once the animal is in the grooming stall 5, the butt bar 38 is inserted through the slots 15 formed in the legs 12 of the U-shaped bar 10. The butt bar 38 is supported in the slot 15 via its weight. In the embodiment using a butt bar having the attached chain and additional bar 42, the attached bar 42 is approximately 6" in length.

It is an advantage of the present invention that due to the minimal number of components forming the grooming stall 5, the owner or trainer can easily reach all spots on the animal in order to clean and groom it. The use of the adjustable butt bar 38 accommodates different sized animals and protects bystanders in the event the animal kicks with its rear legs.

It is a further advantage of the present invention that the grooming stall 5 is formed from either structural aluminum or galvanized steel components. The aluminum components would have a total weight of, for example, approximately 12 lbs. The steel components would weigh approximately 65 lbs, thus enabling either construction to be easily transported not only by hand or vehicle, but also through the UPS service which limits packages to less than 70 lbs.

It is a further advantage of the present invention that the use of the mat 36, together with the weight of the animal, enables the grooming stall to maintain its stability without the need for extraneous structure. For example, a rubber mat 36 typically weighs between 60 and 70 lbs., which enables the grooming stall 5 to have a secure base when the mat overlays either the U-shaped bar 16 or the three plates 50. Furthermore, most horse trainers and handlers already own rubber mats as they are useful for a variety of purposes. In order to make use of previously owned mats, the handler need only modify the mat by cutting holes 37 to accommodate the post 32 for the vertical support legs.

It is further advantage of the present invention that the limited number of lightweight components allows the grooming stall 5 to be set up and easily moved by a single person. Because there are no extra parts, the grooming stall 5 only requires a limited amount of space such that it is extremely useful at crowded display halls.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A lightweight, portable grooming stall for an animal, comprising:

a substantially U-shaped bar having a front portion and two legs;

a three point support system coupling with said U-shaped bar so as to maintain said U-shaped bar in a horizontal attitude;

a base system coupled to said three point support system, said base system underlying said U-shaped bar;

wherein said three point support system engages with said base system at only three distinct points adjacent a floor level; and a restraint system variably positioned across said two legs of said U-shaped bar.

2. A grooming stall according to claim 1, wherein said base system comprises:

a second substantially U-shaped bar supported on the floor level, said second U-shaped bar underlying said U-shaped bar; and a mat arranged to substantially cover said second U-shaped bar whereby the second U-shaped bar and the mat form a stable base system.

3. A grooming stall according to claim 2, wherein said second U-shaped bar is dimensionally larger than said U-shaped bar to provide stability for said base system.

4. A grooming stall according to claim 1, wherein said base system comprises:

three flat base members supported on the floor level, said base members having coupling posts for connecting with said three point support system; and a mat arranged to substantially cover said three flat base members whereby the three flat base members and the mat form a stable base system.

5. A lightweight, portable grooming stall for an animal, comprising:

a substantially U-shaped bar having a front portion and two legs;

a three point support system coupling with said U-shaped bar so as to maintain said U-shaped bar in a horizontal attitude;

a base system coupled to said three point support system, said base system underlying said U-shaped bar;

a restraint system variably positioned across said two legs of said U-shaped bar a second substantially U-shaped bar supported on a floor level, said second U-shaped bar underlying said U-shaped bar;

a mat arranged to substantially cover said second U-shaped bar; and wherein said base system further comprises a plurality of lateral members connected to a top side of said second U-shaped bar, said lateral members including a securing system for attaching said mat to said lateral members.

6. A lightweight, portable grooming stall for an animal, comprising:

a substantially U-shaped bar having a front portion and two legs;

a three point support system coupling with said U-shaped bar so as to maintain said U-shaped bar in a horizontal attitude;

a base system coupled to said three point support system, said base system underlying said U-shaped bar;

a restraint system variably positioned across said two legs of said U-shaped bar a second substantially U-shaped bar supported on a floor level, said second U-shaped bar underlying said U-shaped bar;

a mat arranged to substantially cover said second U-shaped bar; and wherein said three point support system includes three couplings for three support legs, a first of said support legs coupling a midpoint of said front portion with a midpoint of the front portion of said second U-shaped bar, and the other support legs coupling end portions of said legs of the U-shaped bar with end portions of the legs of the second U-shaped bar.

7. A grooming stall according to claim 6, wherein said three couplings comprise tube and pin connections.

8. A grooming stall according to claim 6, wherein said restraint system comprises a butt bar engaging in slots formed at the ends of the legs of said U-shaped bar.

9. A grooming stall according to claim 8, wherein said butt bar includes end caps having a larger transverse cross-section than that of said butt bar.

10. A grooming stall according to claim 8, wherein said butt bar comprises:

chains, one of said chains connecting to respective ends of said butt bar; and weight members, one of said weight members connecting to respective other ends of said chains.

11. A grooming stall according to claim 6, wherein said three couplings comprise:

coupling inserts, said coupling inserts being inserted into said midpoints and end portions of said U-shaped bars and into corresponding ends of said three support legs; and coupling pins extending through said inserts to secure said U-shaped bars to said support legs.

12. A lightweight, portable grooming stall for an animal, comprising:

a substantially U-shaped bar having a front portion and two legs;

a three point support system coupling with said U-shaped bar so as to maintain said U-shaped bar in a horizontal attitude;

a base system coupled to said three point support system, said base system underlying said U-shaped bar;

a restraint system variably positioned across said two legs of said U-shaped bar a second substantially U-shaped bar supported on a floor level, said second U-shaped bar underlying said U-shaped bar;

a mat arranged to substantially cover said second U-shaped bar; and rollers coupled to said second substantially U-shaped bar, said rollers being movable from a first operative position for transporting the grooming stall, to a second, inoperative position, for when the grooming stall is used by the animal.

* * * * *